United States Patent
Wohlberg et al.

(10) Patent No.: US 8,078,448 B1
(45) Date of Patent: Dec. 13, 2011

(54) SYSTEMS AND METHODS FOR AUTOMATED TESTING

(75) Inventors: Tim Wohlberg, Hamburg (DE); Klaas Stöeckmann, Hamburg (DE); Soeren Ammedick, Neumuenster (DE); Kai Ortmanns, Stelle (DE)

(73) Assignee: Adobe Systems Incorporated, San Jose, CA (US)

( * ) Notice: Subject to any disclaimer, the term of this patent is extended or adjusted under 35 U.S.C. 154(b) by 637 days.

(21) Appl. No.: 12/127,570

(22) Filed: May 27, 2008

(51) Int. Cl.
*G06F 9/455* (2006.01)

(52) U.S. Cl. .................. 703/23; 717/115; 703/24

(58) Field of Classification Search .............. 703/23, 703/24; 717/115
See application file for complete search history.

(56) References Cited

U.S. PATENT DOCUMENTS

| | | | |
|---|---|---|---|
| 5,802,312 A * | 9/1998 | Lazaridis et al. | 709/238 |
| 6,167,253 A * | 12/2000 | Farris et al. | 455/412.2 |
| 6,877,099 B2 * | 4/2005 | Sameshima et al. | 713/324 |
| 7,039,444 B2 * | 5/2006 | Tsukamoto | 455/566 |
| 7,155,381 B2 * | 12/2006 | Ryzl | 703/24 |
| 2002/0103881 A1 * | 8/2002 | Granade et al. | 709/218 |
| 2006/0277209 A1 * | 12/2006 | Kral et al. | 707/102 |

OTHER PUBLICATIONS

Connected, Limited Device Configuration (CLDC), J2ME Building Blocks for Mobile Devices, May 2000, Sun Microsystems, Inc., pp. 1-42.*

* cited by examiner

*Primary Examiner* — Dwin M Craig
*Assistant Examiner* — Bernard E Cothran
(74) *Attorney, Agent, or Firm* — Kilpatrick Townsend & Stockton LLP

(57) ABSTRACT

Systems and methods for automated testing are disclosed. In one embodiment, the method includes receiving an input during testing of an application on a first emulated device. The method further includes automatically creating from the input a test module configured to be executed on a second emulated device for testing of the application, wherein the first emulated device is different from the second emulated device. In one embodiment, the system includes a receiver configured to receive an input during testing of an application on a first emulated device. The system further includes a creation module in communication with the receiver and configured to automatically create from the input a test module configured to be executed on a second emulated device for testing of the application, wherein the first emulated device is different from the second emulated device.

19 Claims, 6 Drawing Sheets

SYSTEMS AND METHODS FOR AUTOMATED TESTING

FIELD OF THE DISCLOSURE

Embodiments of the disclosure relate generally to the field of data processing systems. For example, embodiments of the disclosure relate to systems and methods for automated testing of applications on emulated devices.

BACKGROUND

Various types of computing devices exist today. For example, various mobile devices exist, from different mobile phones to personal digital assistants (PDAs) to portable computers. With the variety of devices that may operate under numerous different environments, applications to be executed on a computing device are now developed for multiple types of devices. For example, an application may be developed to execute within a specific runtime environment operating on a computing device, wherein the operating environment may be executed on various types of devices.

As a result of the variety of device architectures and operating environments, an application may execute differently on different devices. Hence, an application must be tested on a specific device to ensure that the application executes properly on the device. For example, a developer may want a game to execute exactly the same on a specific mobile phone as on a specific PDA, or the developer may want a game to run the same on the mobile phone independent of load on the mobile phone or other processes executing on the mobile phone.

One problem with such testing is that an application must be tested for each and every device. To overcome testing an application on a physical device, an application may be tested on an emulated device such that the actual device is not required. In addition, a test script may be created by the user in order to test certain portions of the application while executing on the emulated device.

One problem is that the test script must be manually created before it may be used. Another problem is that a test script must be manually created for each device under a specific operating environment, causing a user to create numerous test scripts for testing the various devices and various operating conditions.

SUMMARY

Systems and methods for automated testing of an application are disclosed. In one embodiment, the method includes receiving input, such as from a user, during manual testing of an application on a first type emulated device. In one embodiment, the emulated device is a first type of mobile phone. The input can be used to create a test module for the application for the first type of emulated device, which can be created automatically or manually. The method further includes automatically creating a test module for the application for another emulated device, such as a second type of mobile phone. In one embodiment, the system includes a receiver configured to receive a user input during manual testing of an application. The system further includes a creation module in communication with the receiver and configured to automatically create a test module from the user input.

These illustrative embodiments are mentioned not to limit or define the disclosure, but to provide examples to aid understanding thereof. Illustrative embodiments are discussed in the Detailed Description, and further description of the disclosure is provided there. Advantages offered by various embodiments of this disclosure may be further understood by examining this specification.

BRIEF DESCRIPTION OF THE DRAWINGS

These and other features, aspects, and advantages of the present disclosure are better understood when the following Detailed Description is read with reference to the accompanying drawings, wherein.

DETAILED DESCRIPTION OF EMBODIMENTS

Figure 1:
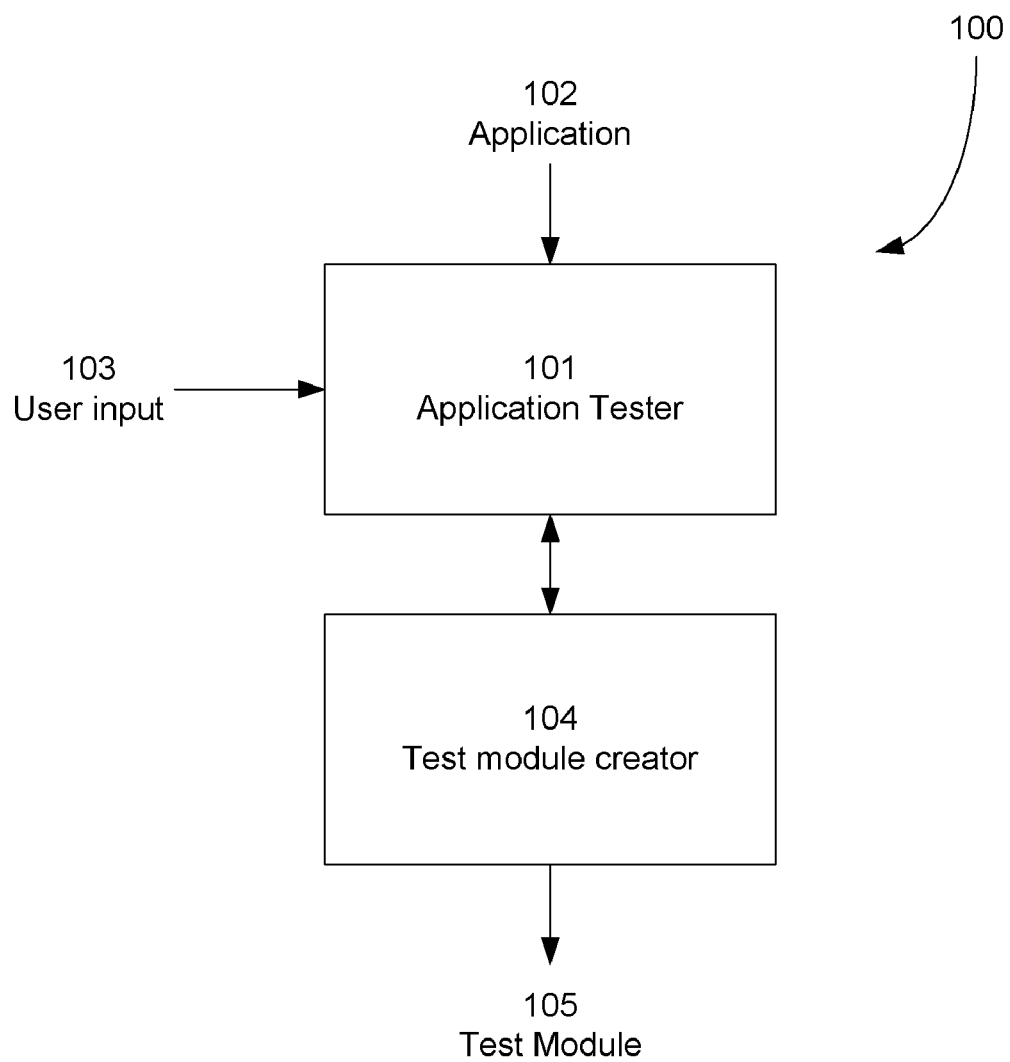
FIG. 1 shows an exemplary system for automatically creating an application test module.

Embodiments of the disclosure relate generally to the field of data processing systems. For example, embodiments of the disclosure relate to systems and methods for automated testing. Throughout the description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

Computing devices, such as mobile devices, may be emulated so that the physical devices are not needed for testing. An application tester may include an emulator so that an application may be tested on an emulated device. In order to emulate a device, an emulator loads an emulation script that when executed emulates the computing device. When a different device is to be emulated, the emulator loads a different emulation script.

The emulator may create the script for a device from a device profile. A device profile may contain the characteristics of a computing device stored in one location, such as a file. For example, a device profile may include the hardware and firmware capabilities of a device, such as the device's allowable display resolutions, display color depth, processor type, and memory size. The device profile may further include settings or operating conditions of the device, such as how much memory and cache are being consumed and other processes that may be executing on the device, time setting on the device, and date setting on the device.

An application may be tested on a device emulated from a device profile. To test the application, a user interacts with the emulated device as if the emulated device is the physical device. While the application is being tested by a user, a test module creator may record the user interactions with the emulated device and features of the emulated device in order to create a test script. The test script then replicates the recorded user interactions such that the application may be tested automatically using the test script.

The test script may be used by an application tester to test the application on any emulated device. To do so, the number of display updates of an emulated device for an application is counted. An instruction of the test script is executed when the number of display updates equals the number of display updates that existed when the user interaction for the instruction was originally received.

Therefore, the application tester may automate testing of an application for multiple emulated devices using the created test script.

Application Testing for Mobile Devices

An application may be any code that is executed on a device. In one embodiment, the application may be code that is executed within a runtime environment on the computing device. Example applications include, but are not limited to, programs (e.g., games, word processing, and calendar), multimedia files (e.g., movies and music), wallpapers, screensavers, and miscellaneous scripts.

An application may be tested in order to find anomalies in the application, such as freezing or display artifacts. The application also may be tested on multiple devices to ensure the application presents the same user experience independent of the device or device profile used to execute the application.

Testing may be performed using a test module so that less user interaction is required. For example, a test module automatically may test an application on an emulated device under a predetermined operating environment. The test module may include instructions that are executed for the application. The test module may also include a snapshot tool in order to capture the display image of the emulated device executing the application. The snapshot tool thus may be used to create a snapshot in order for a user to visually inspect test results after automated testing is performed.

Automatic Creation of an Application Test Module

FIG. 1 shows an exemplary system 100 for automatically creating an application test module 105. In one embodiment, the system 100 for automatically creating an application test module 105 includes an application tester 101 to test application 102 with received user inputs 103 and a test module creator 104 to output the test module 105.

In one embodiment, the application tester 101 is a program executing in a runtime environment of a computing device. For example, the application tester 101 may be an executable that operates within a runtime environment on a desktop computer. The application tester 101 may include an emulator. Thus, the application tester 101 may receive various device profiles in order to emulate a device under a predetermined operating environment.

Figure 2:
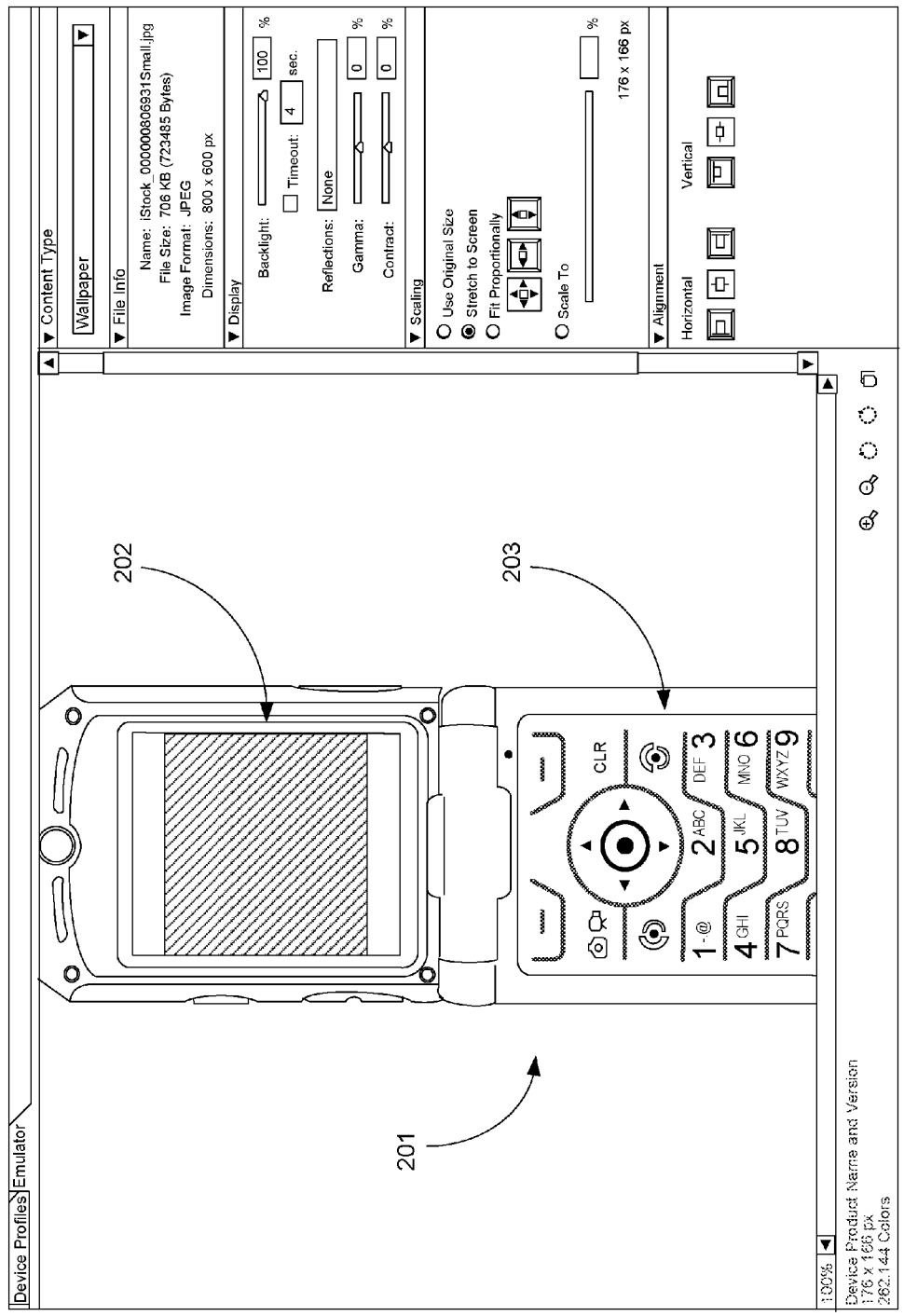
FIG. 2 illustrates a display capture of an application being executed on an emulated device for an application tester.

FIG. 2 illustrates a display capture 200 of an application 202 being executed on an emulated device 201 for an application tester 101. In one embodiment, an interactive image of the emulated device 201 is shown to the user of the application tester 101. The application 202 is viewed on the display of the emulated device 201.

In testing the application 202, inputs may be received from the user via interaction with the controls 203 of the emulated device 201. In the present example, the controls are the illustrated buttons of the emulated device. For example, if the user wishes to press the number 2 button on the emulated device 201, the user may click on the corresponding visual button of the emulated device 201. In one embodiment, hot keys may be set up so that the user may use a keyboard to select a user control 203.

Therefore, a user tests the application 202 by interacting with the emulated device 201 through the user controls 203. In one embodiment, the user may pause and continue testing of the application at any time during testing. The application tester 101 may further include a snapshot tool button or other control in the interface (not shown). When the user enacts the snapshot tool, the application tool 101 records a snapshot of the emulated device display at that instance. The display snapshot may then be retrieved at a later time for inspection by the user.

A user may change some aspects of the testing environment for the application during testing. For example, the user may add reflections to the emulated device display, change the contrast of the display, or change the gamma of the display or the environment's luminance affecting visibility of the display. In one embodiment, the changes made to the testing environment are recorded by the application tester 101. As a result, the created test module may repeat the changing of the test environment during automatic testing.

Figure 3:
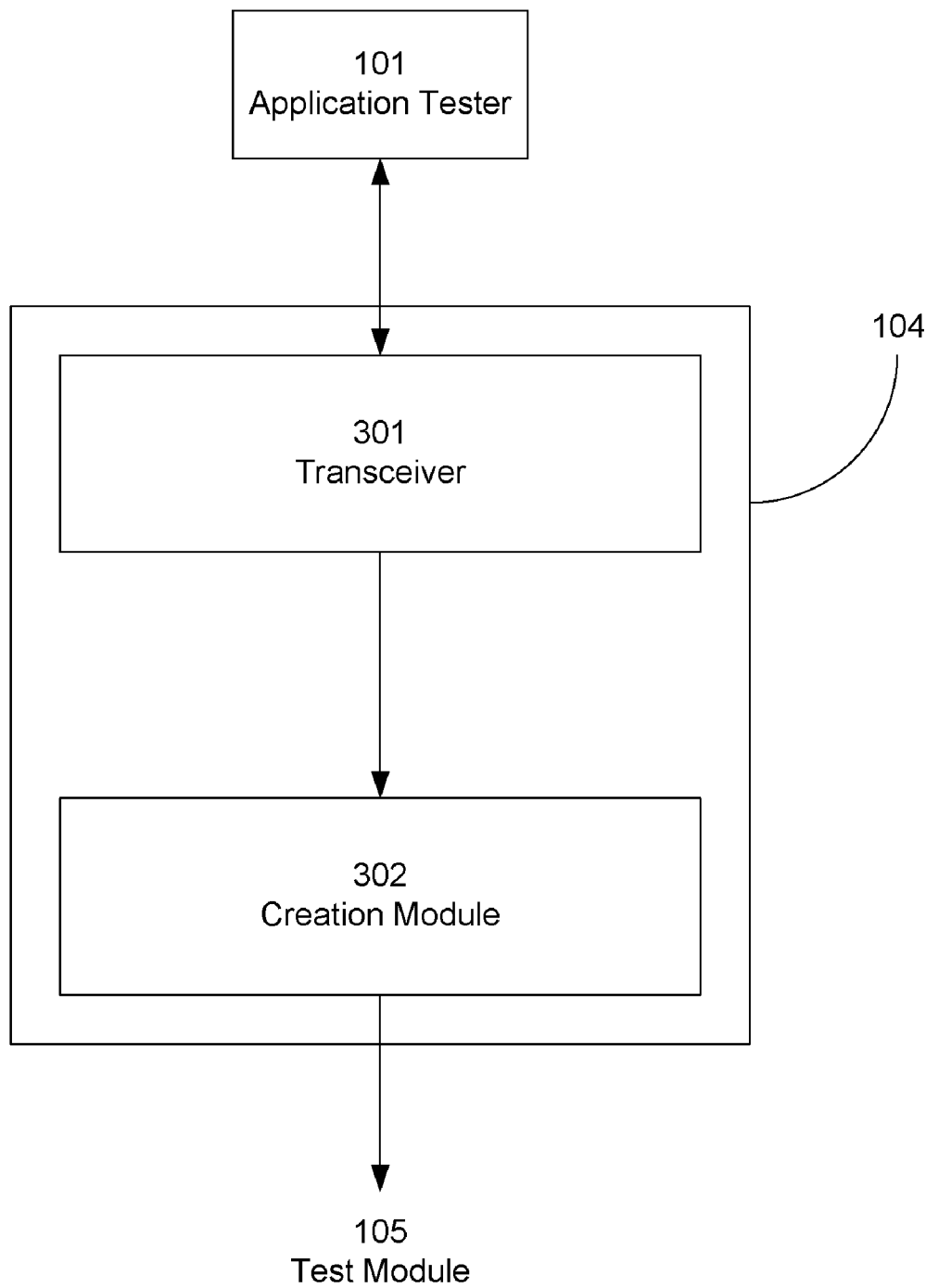
FIG. 3 shows an exemplary test module creator of the exemplary system in FIG. 1.

In one embodiment, the user interactions with the emulated device during testing of an application is used to create a test module 105 by the test module creator 104. FIG. 3 shows an exemplary test module creator 104 of the exemplary system 100 for creating a test module 105. The exemplary test module creator 104 may comprise a transceiver 301 and a creation module 302. In one embodiment, the transceiver 301 is configured to receive user inputs 103 and information about the application 102 from the application tester 101 during testing of an application 102. Example information about the application 102 that may be received includes, but is not limited to, time a display update was performed for an application, number of display updates occurred for an application, notification of a display update, time a user input was received, and number of display updates before a user input was received by the application tester 101.

Display refresh rates for a device may vary between devices and between different device profiles. For example, a device with a higher processor usage from its load or slower processing capability than another device may have a slower display refresh rate. In one embodiment, a display refresh occurs for an application 102 when the application is to change the display of the device. For example, when a character in a game is to move around the device display, the device refreshes the device display in order to display the character moving. Hence, the character is in a first position on the display after a first display refresh. Then, the character is in a second position on the display after a second display refresh. In another embodiment, a display refresh may occur at a periodic interval irrespective of what is shown on the device display. A display update may be a display refresh that produces a different image than displayed before the display refresh. In one embodiment, the application tester 101 counts the number of display updates that occur. Therefore, the counted number of display updates accumulate when changes are made on the display.

In order to synchronize an application for various devices during automatic testing, the application displays the same information after the same number of display updates. For example, if a character of a game is in a first position after a first display update on a first device display, the character should be in the first position after a first display update on a second device display. Thus, the creation module 302 may be configured to receive the user inputs and number of display updates received by the transceiver 301 in order to synchronize user inputs with display updates in creating test module 105.

For some user inputs, the display of the emulated device may not change. For example, a static display may occur after a user presses a plurality of user controls. As a result, multiple user inputs may occur during the same display update if the emulated device is the sole controller of the display updates. In one embodiment, the application tester 101 forces a display update for the emulated device to occur each time a user input is received. Hence, if the snapshot tool is enabled or a button on the emulated device is pressed, the application tester may force a display update to change the number of display updates. Therefore, the display may not change between the two display updates, but the user interactions may be associated with a different number of display updates.

The emulated device 201 also may include a standby or hibernation splash. The display may show the splash when no user input is received for a predetermined amount of time. Therefore, the application may not be shown at all times during testing of the application. In one embodiment, the application tester 101 periodically sends a display update command to the emulated device so that the application may be faithfully recorded during testing. The periodic display update command may be sent to the emulated device after a predetermined amount of time. In one embodiment, the application tester may include a counter in order to count the amount of time since the last update. In one embodiment, the application tester 101 may include a time grid to generate display update requests when no display update requests are needed by the emulated device.

Figure 4:
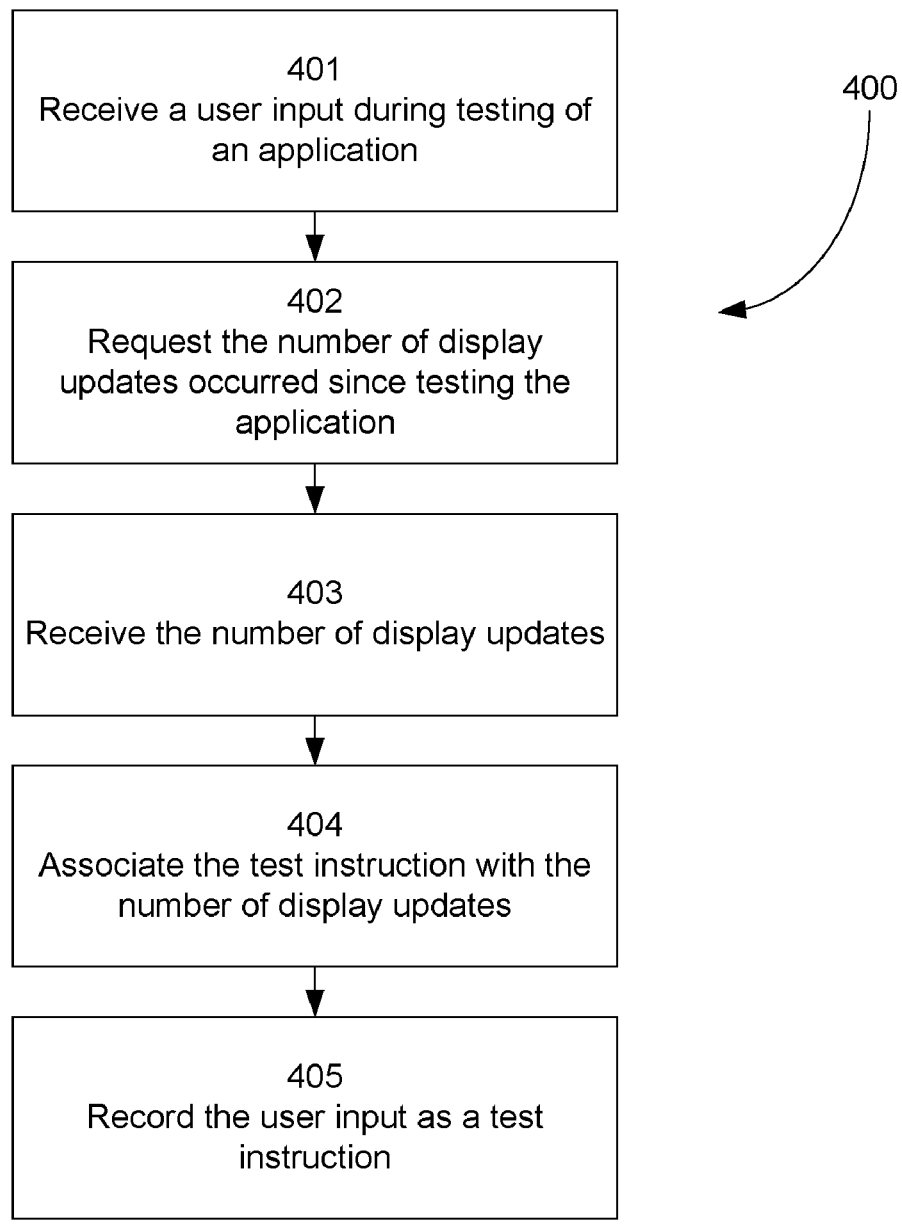
FIG. 4 illustrates an exemplary method for creating a test module by the test module creator in FIG. 3.

FIG. 4 illustrates an exemplary method 400 for creating a test module 105 by the test module creator 104 in FIG. 3. Beginning at 401, the transceiver 301 receives a user input 103 while an application 102 is being tested in the application tester 101. In one embodiment, the user input (e.g., a mouse click or keyboard entry) is interpreted by the application tester 101 as to what user control 203 of the emulated device 201 is selected. Hence, the application tester 101 may send the user control 203 selection to the transceiver 301 as the user input. For example, if the user selects the # button on the emulated device via a pointer click, the application tester 101 interprets the pointer click as selection of the # button user control. Hence, the application tester 101 may send the # button user control to the transceiver 301. In addition, a user input may be a selection of the snapshot tool. Therefore, the application tester 101 may send the user input of enacting the snapshot tool to the transceiver 301.

Upon receiving a user input in 401, the transceiver 301 requests the number of display updates that have occurred on the emulated device 201 since testing the application 102 in 402. In one embodiment, the transceiver 301 is requesting the current counter number from the application tester 101 wherein the application tester 101 is counting the number of display updates that have occurred. Proceeding to 403, the transceiver 301 receives the number of display updates that have occurred on the emulated device 201 from the application tester 101. In another embodiment, the number of display updates may be counted by the test module creator 104. Hence, the application tester 101 may send a notification to the test module creator 104 when a display update occurs so that the test module creator 104 may increment its counter.

Proceeding to 404, the creation module 302 may receive the user input and number of display updates from the transceiver and associate the display updates number with the user input. Thus, the user input is associated with an instance in the application so that the user input may be replicated at the same instance when testing the application. Upon associating the user input with the display update number, the creation module 302 may record the user input as a test instruction in creating the test module 105 in 405. In one embodiment, the test module 105 is a test script that includes instructions or instruction lines. In another embodiment, the test module 105 may be a finite state machine or a plug-in to the application tester 101.

In one embodiment, the test module is human readable (e.g., a test script) so that a user may correctly create a portion or all of a test module. In this embodiment, a user may create the test script manually or amend some or all of a recorded test script to create a test module. This allows a user to correct a portion of the test script without recording all user input again to create the test module.

Figure 5:
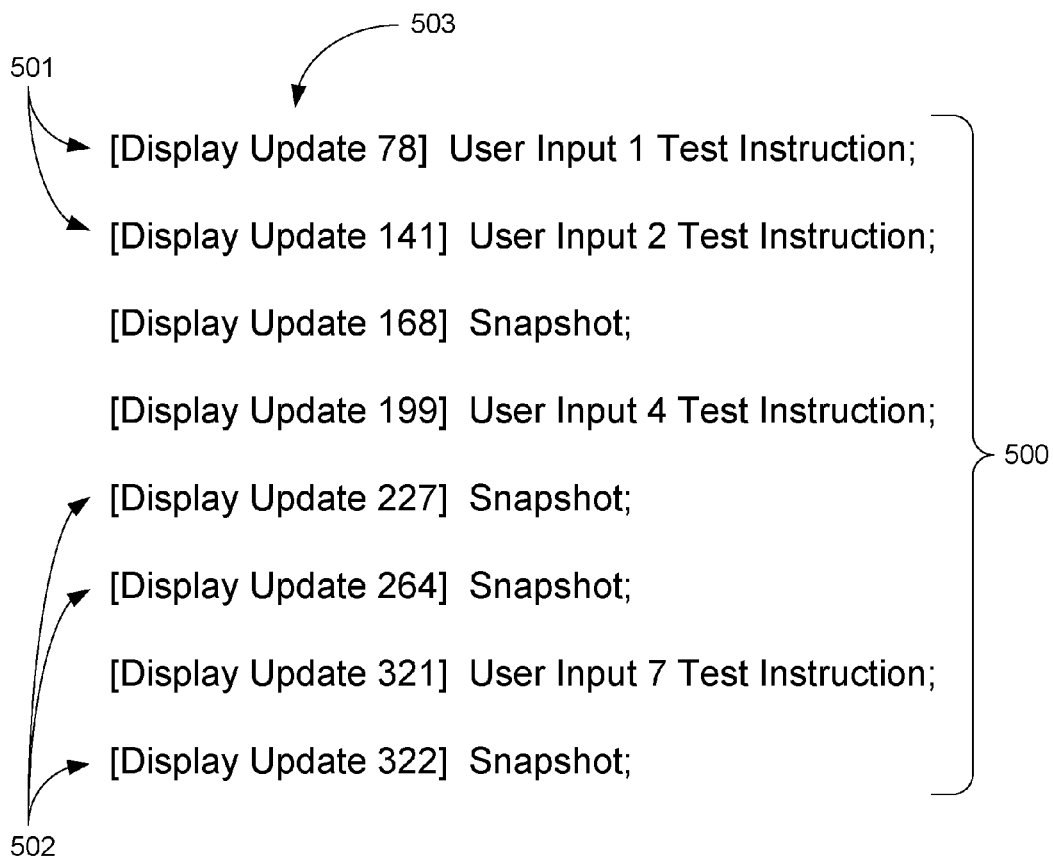
FIG. 5 illustrates a portion of an example test module created by the test module creator in FIG. 3.

FIG. 5 illustrates a portion of an example test script 500 created by the test module creator 104 in FIG. 3. The test script 500 may include instructions 501 to execute user inputs of the user controls 203 of the emulated device 201 and snapshot instructions 502 to enact the snapshot function of the application tester 101. In one embodiment, each test instruction 501-502 is associated with a display update number 503.

Instructions may be added to the test script by reiterating method 400 until testing or recording of the user testing is complete. In one embodiment, to begin recording of user inputs and application information in creating a test module 105, the user may select a test module creation function of the application tester 101. For example, the user may select a record button on the application tester interface to begin recording user inputs and application information. In order to terminate recording of the testing, the user may again select the record button.

Upon recording all of the test instructions for the test module 105, the test module 105 may be stored for future testing of the application. The test module 105 may then be sent to other application testers so that multiple users automatically may test an application at one time.

When testing the application on an emulated device using the example test script 500, the display update number for the application may be monitored. Starting at the beginning of the test script, the next instruction of the test script 500 is executed when the display update number 503 equals the display update number of the application on the emulated device. Therefore, the application tester automatically may recreate a user input via the user control or snapshot at the same instance in the application each time the application is tested.

In one embodiment, the test script 500 may be amended after the test script is created. For example, if a user determines another snapshot is wanted in reviewing the testing of an application, an additional snapshot instruction 502 may be typed by the user into the test script 500 for a specific display update number 503. In one embodiment, the test module 105 is in a generic format. Therefore, the runtime environment of an emulated device may be configured to execute the test module 105 independent of the type of device being emulated. As a result, in testing an application for multiple devices and/or device profiles, multiple devices and/or device profiles may be selected. The application tester then may load the application on each emulated device and execute the test module for the application on each emulated device.

Exemplary Computer Architecture for Implementation of Systems and Methods

Figure 6:
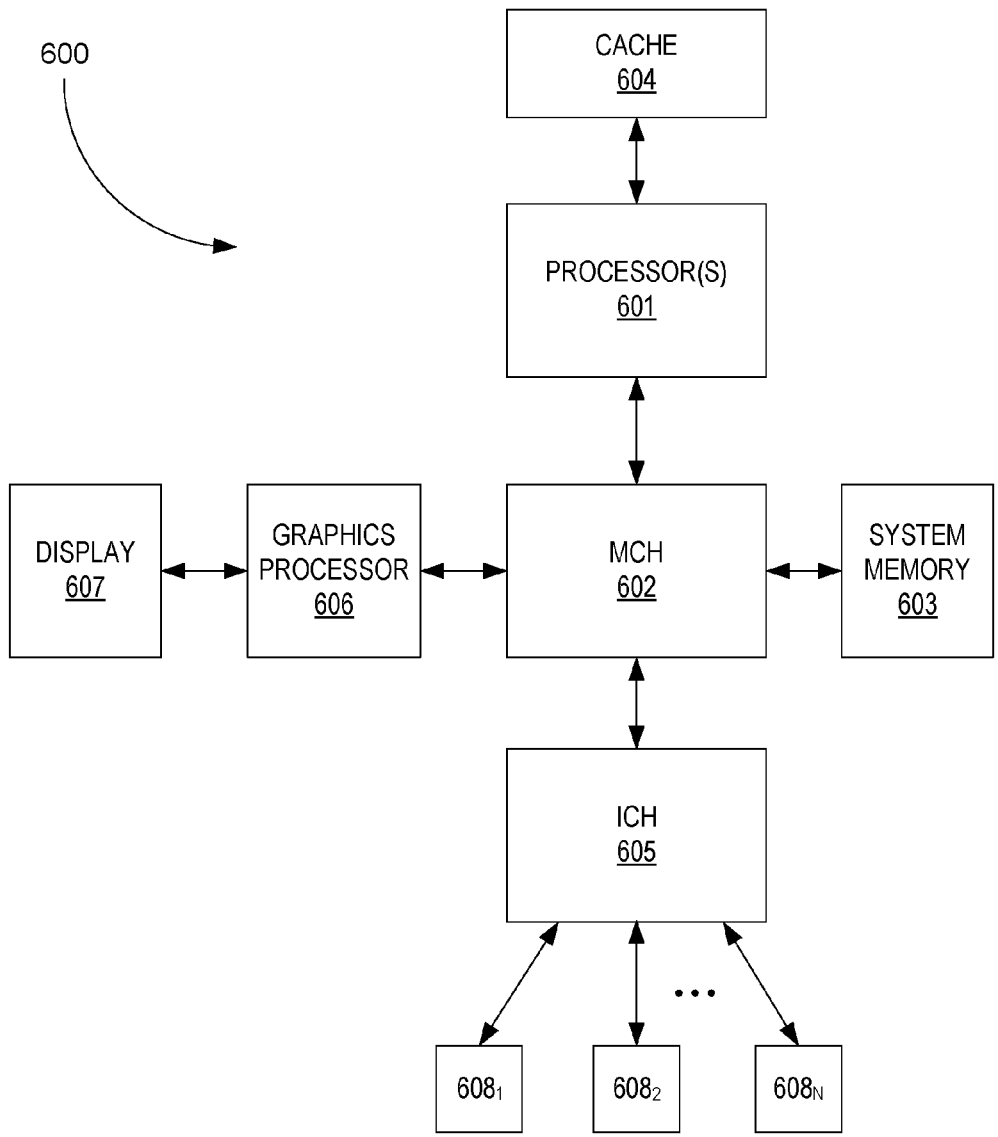
FIG. 6 illustrates an exemplary computer architecture for implementation of the example devices of FIGS. 1 and 3 and execution of the example method of FIG. 4.

FIG. 6 illustrates an example computer architecture 600 for implementing a the test module creation systems as described in FIGS. 1 and 2. The exemplary computing system of FIG. 6 includes: 1) one or more processors 601; 2) a memory control hub (MCH) 602; 3) a system memory 603 (of which different types exist such as DDR RAM, EDO RAM, etc,); 4) a cache 604; 5) an I/O control hub (ICH) 605; 6) a graphics processor 606; 6) a display/screen 606 (of which different types exist such as Cathode Ray Tube (CRT), Thin Film Transistor (TFT), Liquid Crystal Display (LCD), DPL, etc.); and/or 8) one or more I/O devices 608.

The one or more processors 601 execute instructions in order to perform whatever software routines the computing system implements. The instructions frequently involve some sort of operation performed upon data. Both data and instructions are stored in system memory 603 and cache 604. Cache 604 is typically designed to have shorter latency times than system memory 603. For example, cache 604 might be integrated onto the same silicon chip(s) as the processor(s) and/or constructed with faster SRAM cells while system memory 603 might be constructed with slower DRAM cells. By tending to store more frequently used instructions and data in the cache 604 as opposed to the system memory 603, the overall performance efficiency of the computing system improves.

System memory 603 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 603 prior to their being operated upon by the one or more processor(s) 601 in the implementation of a software program. Similarly, data that a software program determines should be sent from the computing system to an outside entity through one of the computing system interfaces, or stored into an internal storage element, is often temporarily queued in system memory 603 prior to its being transmitted or stored.

The ICH 605 is responsible for ensuring that such data is properly passed between the system memory 603 and its appropriate corresponding computing system interface (and internal storage device if the computing system is so designed). The MCH 602 is responsible for managing the various contending requests for system memory 603 access amongst the processor(s) 601, interfaces and internal storage elements that may proximately arise in time with respect to one another.

One or more I/O devices 608 are also implemented in a typical computing system. I/O devices generally are responsible for transferring data to and/or from the computing system (e.g., a networking adapter); or, for large scale non-volatile storage within the computing system (e.g., hard disk drive). ICH 605 has bi-directional point-to-point links between itself and the observed I/O devices 608.

Referring back to FIGS. 1 and 2, modules of the different embodiments of the described system may include software, hardware, firmware, or any combination thereof. The modules may be software programs executing within a runtime environment and available to the public or special or general purpose processors running proprietary or public software. The software may also be specialized programs written specifically for profile package creation and publishing. For example, storage of the system may include, but is not limited to, hardware (such as floppy diskettes, optical disks, CD-ROMs, and magneto-optical disks, ROMs, RAMs, EPROMs, EEPROMs, flash, magnetic or optical cards, propagation media or other type of media/machine-readable medium), and software (such as instructions to require storage of information on a hardware storage unit, or any combination thereof.

In addition, elements of the present disclosure may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, flash, magnetic or optical cards, propagation media or other type of media/machine-readable medium suitable for storing electronic instructions.

For the exemplary method illustrated in FIG. 3, embodiments of the disclosure may include the various processes as set forth above. The processes may be embodied in machine-executable instructions which cause a general-purpose or special-purpose processor to perform certain processes. For example, a program executed in a runtime environment may perform certain processes. Alternatively, these processes may be performed by specific hardware components that contain hardwired logic for performing the processes, or by any combination of programmed computer components and custom hardware components.

Embodiments of the disclosure do not require all of the various processes presented, and it may be conceived by one skilled in the art as to how to practice the embodiments of the disclosure without specific processes presented or with extra processes not presented. For example, while it has been described of having a transceiver, a separate receiver and transmitter may be used in connecting to the application tester. In another example, the test creation module may be a plug-in or portion of the application tester.

General

The foregoing description of the embodiments of the disclosure has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

What is claimed is:

1. A computer-implemented method, comprising:
receiving, at a computing system, an input during testing of an application on a first emulated device and information during the testing of the application on the first emulated device, the information comprising a number of display updates that occurred before the input was received; and
automatically creating, by executing instructions using a processor of the computing system, from the input a test module configured to be executed on a second emulated device for testing of the application, wherein the test module is a test script, wherein each instruction of the test script comprises a display update number configured to synchronize the instruction to a display update of the second emulated device executing the application, wherein the first emulated device is different from the second emulated device.

2. The computer-implemented method of claim 1, wherein the test script is editable.

3. The computer-implemented method of claim 1, wherein the first emulated device and the second emulated device are mobile devices.

4. The computer-implemented method of claim 1, further comprising:
receiving a plurality of inputs; and
creating an instruction in the test script for each of the plurality of inputs.

5. The computer-implemented method of claim 4, wherein the plurality of inputs comprise a selection of a user control of the emulated device.

6. A system, comprising: a processor configured to execute instructions stored in memory to perform steps comprising: receiving an input during testing of an application on a first emulated device, receiving information during the testing of the application on the first emulated device, the information comprising a number of display updates that occurred before the input was received; and and automatically creating from the input a test module configured to be executed on a second emulated device for testing of the application, wherein the test module is a test script, wherein each instruction of the test script comprises a display update number configured to synchronize the instruction to a display update of the second emulated device executing the application, wherein the first emulated device is different from the second emulated device, wherein the first emulated device is different from the second emulated device.

7. The system of claim 6, wherein the first emulated device and the second emulated device are mobile devices.

8. The system of claim 6, wherein:
the receiver is further configured to receive a plurality of inputs; and
the creation module is further configured to create an instruction in the test script for each of the plurality of inputs.

9. The system of claim 8, wherein the input may be at least one of:
a selection of a user control of the emulated device; and
a selection of a snapshot tool.

10. A non-transitory computer-readable medium on which is encoded program code, comprising:
program code to receive an input during testing of an application on an emulated device and information during the testing of the application on the first emulated device, the information comprising a number of display updates that occurred before the input was received; and
program code to automatically create from the input a test module configured to be executed on a second emulated device for testing of the application, wherein the test module is a test script, wherein each instruction of the test script comprises a display update number configured to synchronize the instruction to a display update of the second emulated device executing the application, wherein the first emulated device is different from the second emulated device.

11. The computer-readable medium of claim 10, wherein the first emulated device and the second emulated device are mobile devices.

12. The computer-readable medium of claim 10, further comprising:
program code to receive a plurality of inputs; and
program code to create an instruction in the test script for each of the plurality of inputs.

13. The computer-readable medium of claim 12, wherein the input may be at least one of:
a selection of a user control of the emulated device; and
a selection of a snapshot tool.

14. The computer-readable medium of claim 10, wherein the test script is editable.

15. The computer-implemented method of claim 4, wherein the plurality of inputs comprise a selection of a snapshot tool.

16. The computer-implemented method of claim 1 further comprising receiving information during the testing of the application on the first emulated device, the information comprising a time a display update was performed and a time the input was received.

17. The computer-implemented method of claim 1 further comprising receiving information during the testing of the application on the first emulated device, the information comprising a notification of a display update.

18. A computer-implemented method, comprising:
receiving, at a computing system, an input during testing of an application on a first emulated device; and
automatically creating, by executing instructions using a processor of the computing system, from the input a test module configured to be executed on a second emulated device for testing of the application, wherein the test module is a test script, wherein each instruction of the test script comprises a display update number configured to synchronize the instruction to a display update of the second emulated device executing the application, wherein in order to synchronize the instruction, the instruction is used after a same number of display updates on both the first emulated device and the second emulated device, wherein the same number of display updates is the display update number;
wherein the first emulated device is different from the second emulated device.

19. A computer-implemented method, comprising:
receiving, at a computing system, an input during testing of an application on a first emulated device, receiving the input comprising receiving multiple user inputs during a same display update during the testing of the application on the first emulated device;
forcing a display update to change the number of display updates for each of the multiple user inputs so that each of the multiple user inputs is associated with a different number of display updates; and
automatically creating, by executing instructions using a processor of the computing system, from the input a test module configured to be executed on a second emulated device for testing of the application, wherein the test module is a test script, wherein each instruction of the test script comprises a display update number configured to synchronize the instruction to a display update of the second emulated device executing the application;
wherein the first emulated device is different from the second emulated device.

* * * * *

UNITED STATES PATENT AND TRADEMARK OFFICE
CERTIFICATE OF CORRECTION

PATENT NO.       : 8,078,448 B1                                         Page 1 of 1
APPLICATION NO.  : 12/127570
DATED            : December 13, 2011
INVENTOR(S)      : Tim Wohlberg et al.

It is certified that error appears in the above-identified patent and that said Letters Patent is hereby corrected as shown below:

Column 9, Line 11 (Claim 6, Line 8)
Delete the word "and"

Signed and Sealed this
Tenth Day of April, 2012

David J. Kappos
*Director of the United States Patent and Trademark Office*